W. A. DROMGOOLE.
WAGON.
APPLICATION FILED AUG. 9, 1916.
1,282,551.
Patented Oct. 22, 1918.
2 SHEETS—SHEET 1.
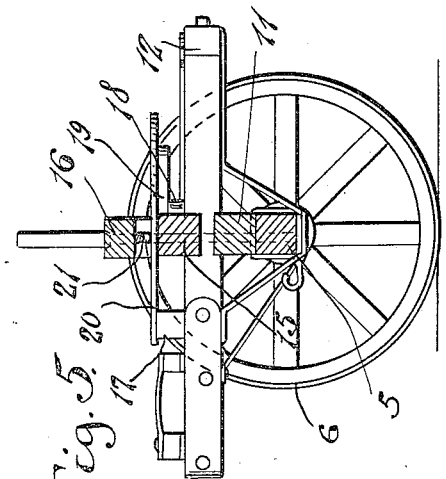
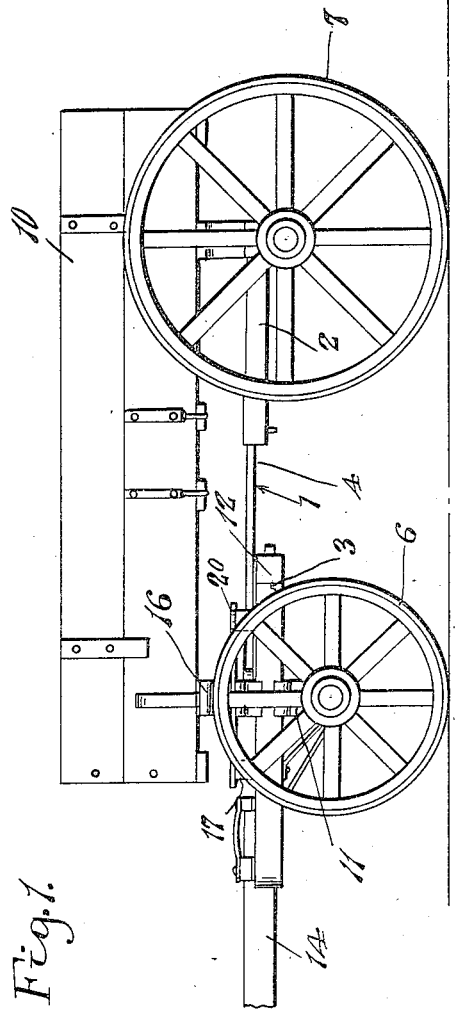
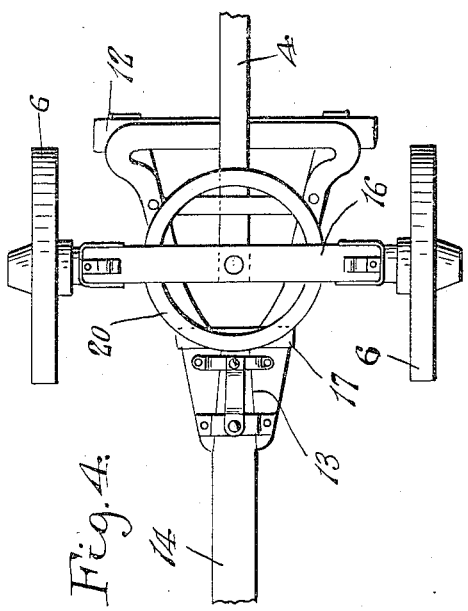
Witness
J. P. Wahler.
Rob. Meyer.
Inventor
W. A. Dromgoole.
By
Attorney

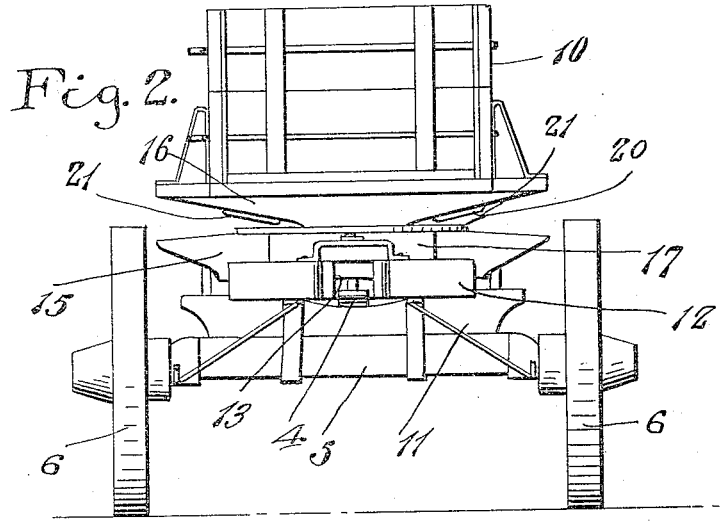
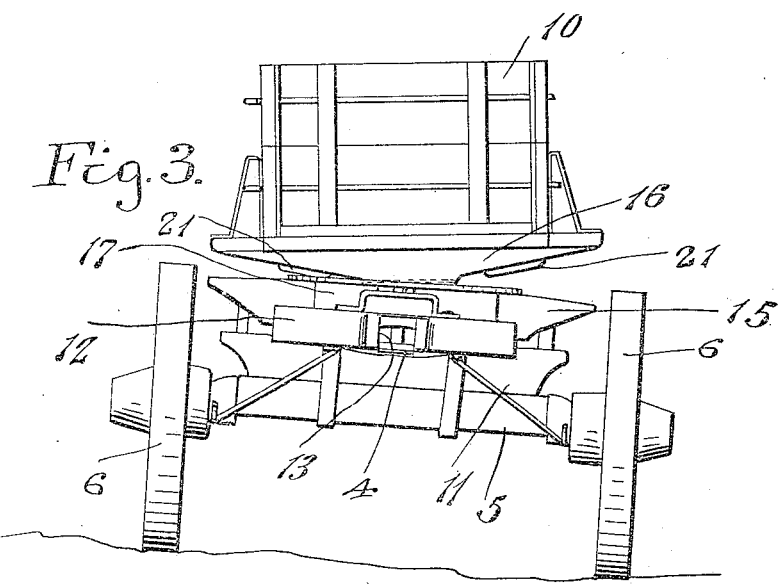

UNITED STATES PATENT OFFICE.

WILLIAM A. DROMGOOLE, OF EDWARDS, MISSISSIPPI.

WAGON.

1,282,551.  Specification of Letters Patent.  Patented Oct. 22, 1918.

Application filed August 9, 1916. Serial No. 114,052.

*To all whom it may concern:*

Be it known that I, WILLIAM A. DROMGOOLE, a citizen of the United States, residing at Edwards, in the county of Hinds and State of Mississippi, have invented certain new and useful Improvements in Wagons; and I do hereby declare the following to be a full, clear, and exact description of the invention, such as will enable others skilled in the art to which it appertains to make and use the same.

This invention relates to wagons, and more particularly to an improvement on an ordinary farm wagon.

The primary object of the invention is to provide an improved wagon structure which includes means whereby the wagon may be turned in a comparatively small space and also means which will hold the bed or body of the wagon level regardless of the engagement with one of the front wheels with rough places in a roadway, such as ruts, holes or obstacles.

A further object of this invention is to provide an improved wagon as specified which includes a supplemental sand bolster, attached to the upper surface of the ordinary axle, which increases the strength of the front construction of the wagon and also to mount a ring or fifth wheel structure upon the upper surface of the sand bolster adapted to be engaged by wear plates carried by the under surface of the swiveled bolster, for maintaining the bed in a level horizontal position under different axle movements.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a side elevation of a wagon constructed in accordance with this invention.

Fig. 2 is a front end view of the wagon.

Fig. 3 is a front end view of the wagon showing the axle tilted.

Fig. 4 is a top plan view of the front axle and hound structure of the wagon, and Fig. 5 is a vertical section through the front axle and hound structure.

Referring more particularly to the drawings, 1 designates the running gears of the wagon as an entirety, which includes hind gears 2 of the ordinary construction, which are connected to the front gears generically indicated by the numeral 3 by a coupling pole 4.

The front gears include an axle 5 of the ordinary construction, on the outer spindle ends of which are mounted supporting wheels 6. The supporting wheels 6 are smaller in diameter than the rear supporting wheels 7, and are capable of cutting under the bed 10 of the wagon for facilitating the turning of the wagon in a comparatively small space. The reducing of the diameter of the front wheels also increases their strength. An auxiliary sandboard 11 is mounted on the axle 5, and the hounds 12 are mounted upon the upper surface of the auxiliary sandboard 11. The hounds 12 are of the ordinary construction, having the usual socket 13 for receiving the end of a tongue 14, as clearly shown in Fig. 4 of the drawings. The ordinary sandboard 15 is mounted upon the hounds 12 and it pivotally supports the bolster 16, which in turn supports the front end of the bed 10.

The hounds 12 have a block 17 attached to their upper surfaces forwardly of the sandboard 15, and a second block 18 mounted upon their upper surfaces rearwardly of the sandboard 15. A plate 19 is supported by the block 18. A metallic circle or fifth wheel 20 is mounted upon the upper surface of the block 17 and the plate 19 and it extends beneath the bolster 16.

The bolster 16 has wear plates 21 attached to the under surface of the same, which wear plates are provided for engagement with the ring 20, when one of the front supporting wheels 6 engages a rough place in the highway over which the wagon is traveling, as shown in Fig. 3 of the drawings.

The provision of the metallic circle 20 eliminates the employment of the ordinary dog iron which runs from the front end to the rear end of the hounds, and it will hold the bed in a horizontal or level position, preventing the rocking bolster from sagging, which would cause the front end of the body to dip at one corner and often times throws the body out of the bolster; and which further permits the front wheels to "cut under" the wagon bed, which enables the wagon to be turned in a relatively small space, without tipping the bed, or moving the bed upon the bolster. The blocks or sub-bolsters or boards 17 and 18 add to the strength of the hounds.

From the foregoing description taken in connection with the accompanying drawings the advantages of construction and of the method of operation of the improved wagon will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a wagon structure, the combination of a front axle; an auxiliary sandboard mounted upon said axle; an ordinary hound mounted on said auxiliary sandboard, an ordinary sandboard arranged on said hound and directly above said auxiliary sandboard; a pair of blocks extending transversely across the hound and parallel to the main sandboard and on the opposite sides thereof, a metallic ring arranged on the main sandboard and the blocks, a rocking bolster pivotally arranged on said main sandboard; and wear plates carried by the under surface of said rocking bolster and adapted to engage the metallic ring.

In testimony whereof I affix my signature in presence of two witnesses.

WILLIAM A. DROMGOOLE.

Witnesses:
H. P. BIRDSONG,
WILLIS MATTHEW.

Copies of this patent may be obtained for five cents each, by addressing the "Commissioner of Patents, Washington, D. C."